United States Patent
Ohara et al.

(10) Patent No.: US 11,438,815 B2
(45) Date of Patent: Sep. 6, 2022

(54) USER EQUIPMENT AND BASE STATION APPARATUS

(71) Applicant: NTT DOCOMO, INC., Tokyo (JP)

(72) Inventors: Tomoya Ohara, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 31 days.

(21) Appl. No.: 17/265,091

(22) PCT Filed: Aug. 7, 2018

(86) PCT No.: PCT/JP2018/029691
§ 371 (c)(1),
(2) Date: Feb. 1, 2021

(87) PCT Pub. No.: WO2020/031279
PCT Pub. Date: Feb. 13, 2020

(65) Prior Publication Data
US 2021/0306919 A1    Sep. 30, 2021

(51) Int. Cl.
*H04W 4/00*      (2018.01)
*H04W 36/00*     (2009.01)

(52) U.S. Cl.
CPC .  *H04W 36/00837* (2018.08); *H04W 36/0058* (2018.08); *H04W 36/0094* (2013.01)

(58) Field of Classification Search
CPC ............. H04W 24/10; H04W 36/0058; H04W 36/00837; H04W 36/0085; H04W 36/0088; H04W 36/0094
See application file for complete search history.

(56) References Cited

FOREIGN PATENT DOCUMENTS

| JP | 2005-347906 A | 12/2005 |
| JP | 2010-193456 A | 9/2010 |
| JP | 2015-512226 A | 4/2015 |
| WO | 2017/118898 A1 | 7/2017 |

OTHER PUBLICATIONS

International Search Report issued in PCT/JP2018/029691 dated Oct. 16, 2018 (5 pages).
Written Opinion of the International Searching Authority issued in PCT/JP2018/029691 dated Oct. 16, 2018 (4 pages).
3GPP TS 38.300 V15.2.0; "3rd Generation Partnership Project; Technical Specification Group Radio Access Network NR; NR and NG-RAN Overall Description; Stage 2 (Release 15)"; Jun. 2018 (87 pages).
3GPP TS 38.133 V15.2.0; "3rd Generation Partnership Project; Technical Specification Group Radio Access Network NR; Requirements for support of radio resource management (Release 15)"; Jun. 2018 (79 pages).
Extended European Search Report in counterpart European Application No. 18 92 9258.4 dated Feb. 17, 2022 (11 pages).

*Primary Examiner* — Matthew W Genack
(74) *Attorney, Agent, or Firm* — Osha Bergman Watanabe & Burton LLP

(57) ABSTRACT

A user equipment has a reception unit configured to receive from a base station apparatus a measurement configuration including an event that sets a condition for sending a measurement report, a control unit configured to perform a measurement based on the measurement configuration, and a transmission unit configured to send to the base station apparatus, when the condition for sending a measurement report is met, a measurement report based on a result of the performed measurement, wherein the control unit determines, based on the result of the performed measurement, a period with which a measurement is performed.

3 Claims, 7 Drawing Sheets

USER EQUIPMENT AND BASE STATION APPARATUS

TECHNICAL FIELD

The present invention relates to a user equipment and a base station apparatus in a wireless communication system.

BACKGROUND ART

For New Radio (also referred to as "5G"), a successor system to Long-Term Evolution (LTE), techniques that satisfy requirements such as a large capacity system, high data transmission speed, low delay, simultaneous connections of a number of terminals, low cost, and low power consumption have been discussed (e.g., Non-Patent Document 1).

As a requirement for user equipment measurements, NR specifies permissible delay time from the occurrence of an event to be measured to transmission of a measurement report (e.g., Non-Patent Document 2)

RELATED-ART DOCUMENTS

None-Patent Document

None-Patent Document 1: 3GPP TS 38.300 V15.2.0 (2018-06)
None-Patent Document 2: 3GPP TS 38.133 V15.2.0 (2018-06)

SUMMARY OF THE INVENTION

Problem to be Solved by the Invention

In a NR wireless communication system, since a user equipment sends a measurement report within the permissible delay time, measurements need to be performed with a uniform period regardless of communication conditions to obtain measurement results.

In view of the above, it is an object of the present invention to allow a user equipment to effectively perform measurements in a wireless communication system.

Means to Solve the Problem

According to the disclosed technique, there is provided a user equipment comprising a reception unit configured to receive from a base station apparatus a measurement configuration including an event that sets a condition for sending a measurement report, a control unit configured to perform a measurement based on the measurement configuration and a transmission unit configured to send to the base station apparatus a measurement report based on a result of the performed measurement when a condition for sending the measurement report is met, wherein the control unit determines, based on the result of the performed measurement, a period with which a measurement is performed.

Advantage of the Invention

According to the disclosed technique, the user equipment can effectively perform measurements in a wireless communication system.

MODE FOR CARRYING OUT THE INVENTION

Figure 1:
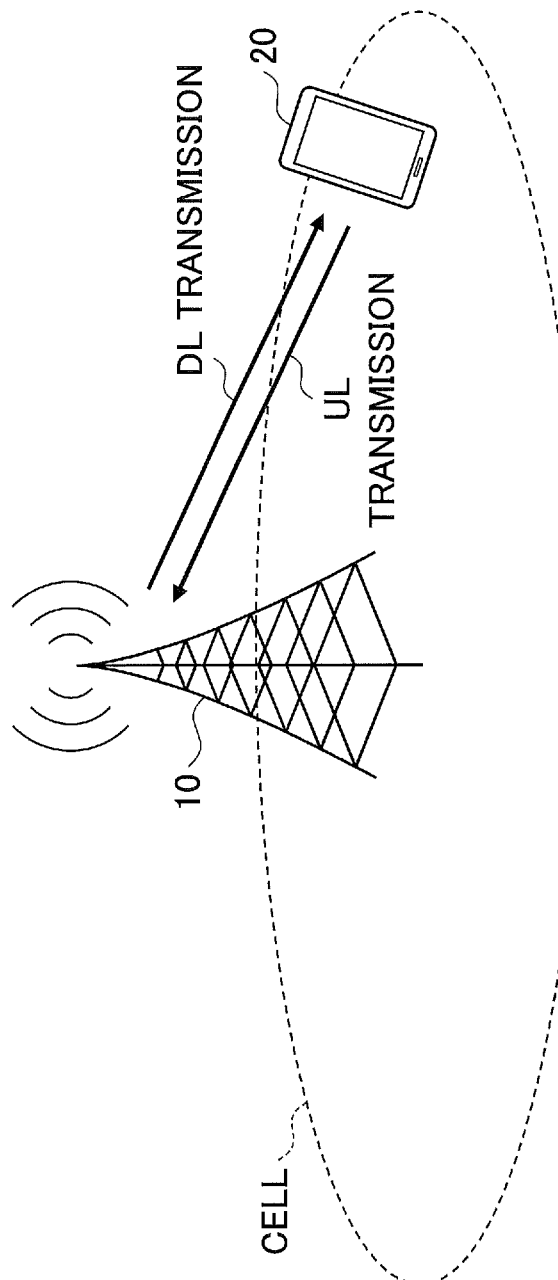
FIG. 1 is a diagram for illustrating a wireless communication system in an embodiment of the present invention.

Hereinafter, embodiments of the present invention will be described with reference to the drawings. It should be noted that the embodiments described below are merely an example, and embodiments to which the present invention can be applied are not limited to the following embodiments.

For operations of a wireless communication system in the embodiments of the present invention, a preexisting technique is used as appropriate. However, the preexisting technique may be, but is not limited to, preexisting LTE, for example. Unless otherwise specified, the term "LTE" as used herein should be construed as having a broad meaning and includes LTE-Advanced and systems subsequent to LTE-Advanced (e.g., NR).

Further, in the embodiments of the present invention described below, terms used in connection with the pre-existing LTE, such as a synchronization signal (SS), a primary SS (PSS), a secondary SS (SSS), a physical broadcast channel (PBCH), and a physical random access channel (PRACH), will be used for the sake of convenience of description, and different terms may be used to refer to signals and functions that are similar to the above. Further, as for NR, the above terms correspond to NR-SS, NR-PSS, NR-SSS, NR-PBCH, NR-PRACH and the like. However, "NR-" will not always be used expressly to refer to signals that are used in NR.

In the embodiments of the present invention, a duplex system may be a time division duplex (TDD) system or a frequency division duplex (FDD) system or any other system (e.g., flexible duplex).

Further, in the following description, a system for transmitting a signal using a transmission beam may be digital beam forming in which a signal multiplied by a precoding vector (precoded with a precoding vector) or analog beam forming that achieves beam forming using a variable phase shifter in a radio frequency (RF) circuit. Similarly, a system for receiving a signal using reception beam may be digital beam forming in which a received signal is multiplied by a predetermined weighted vector or analog beam forming that achieves beam forming using a variable phase shifter in a RF circuit. Hybrid beam forming as a combination of digital beam forming and analog beam forming may be applied. Further, transmission of a signal using a transmission beam may be transmission of a signal with a specific antenna port. Similarly, reception of a signal using a reception beam may be reception of a signal with a specific antenna port. An antenna port refers to a logical antenna port or a physical antenna port defined in the 3GPP specifications.

Methods for forming transmission beam and reception beam are not limited to the above methods. For example, when there are a base station apparatus 10 and a user equipment 20 each having a plurality of antennas, a method of changing the angle of each antenna may be used, a combination of a method of using a precoding vector and the method of changing antenna angle may be used, different antenna panels may be switched and used, a method of using a combination of a plurality of antenna panels may be used, and another method may be used. Further, a plurality of different transmission beams may be used in a high frequency band. Using a plurality of transmission beams is referred to as a multi-beam operation and using one transmission beam is referred to as a single-beam operation.

Further, in the embodiments of the present invention, "configuring" wireless parameters and the like may be pre-configuring predetermined values or may be configuring wireless parameters reported from the base station apparatus 10 or the user equipment 20.

FIG. 1 is a diagram for illustrating a wireless communication system in an embodiment of the present invention. As shown in FIG. 1, the wireless communication system in the embodiment of the present invention comprises a base station apparatus 10 and a user equipment 20. Although FIG. 1 shows only one base station apparatus 10, and one user equipment 20, this is merely an example and the system may comprise a plurality of base station apparatuses and user equipments.

The base station apparatus 10 is a communication equipment that provides one or more cells and performs wireless communication with the user equipment 20. A physical resource of a wireless signal is defined by a time domain and a frequency domain, and the time domain may be defined by the number of OFDM symbols and the frequency domain may be defined by the number of subcarriers or the number of resource blocks. The base station apparatus 10 sends a synchronization signal and system information to the user equipment 20. The synchronization signal may be, for example, NR-PSS and NR-SSS. The system information is sent in NR-PBCH, for example, and is also referred to as broadcast information. As shown in FIG. 1, the base station apparatus 10 sends to the user equipment 20 a control signal or data in downlink (DL) and receives from the user equipment 20 a control signal or data in uplink (UL). Each of the base station apparatus 10 and the user equipment 20 can send and receive a signal by carrying out beam forming.

The user equipment 20 is a communication equipment with a wireless communication function, such as a smartphone, a mobile phone, a tablet, a wearable terminal, a Machine-to-Machine (M2M) communication module or the like. As shown in FIG. 1, the user equipment 20 utilizes a variety of communication services provided by the wireless communication system by receiving from the base station apparatus 10 a control signal or data in DL and sending to the base station apparatus 10 a control signal or data in UL.

The user equipment 20 performs measurements to determine communication conditions. For the user equipment 20, the base station apparatus 10 designates an event as a measurement configuration. When a condition for the measurement result set in the event is met, the user equipment 20 sends a measurement report to the base station apparatus 10.

For example, the event indicates a condition for sending a measurement report, such as "when reference signal received quality (RSRQ) is below X dB", "when the RSRQ of cell A exceeds the RSRQ of cell B by Y dB" or "when the RSRQ of frequency band A exceeds the RSRQ of cell B by Y dB." The event can trigger measurement reporting when the condition is met. Further, as a parameter, there is hysteresis in order to prevent a ping-pong phenomenon where handovers frequently occur between two cells.

As a requirement for a measurement performed by the user equipment 20, the NR specifications specify permissible delay time from the actual occurrence of an event to transmission of a measurement report. That is, at least within this permissible delay time period, the user equipment 20 needs to perform a measurement from which appropriate measurement results can be obtained. To obtain appropriate measurement results, a plurality of samples may be needed. Therefore, a period with which a measurement is performed may be shorter than the permissible delay time period. A period with which a measurement is performed affects power consumption of the user equipment 20.

In order to meet the requirements specified in the specifications, the user equipment 20 needs to perform measurements regardless of the contents of event configurations, measurement results or terminal capability. However, even when the result of the measurement performed by the user equipment 20 is far from the condition set by the event and an environment is less likely to change in a short period of time in such a way that the condition set in the event is met, it is necessary to carry out a measurement in accordance with the requirements as specified.

Thus, when an environment is less likely to change in such a way that the condition set by the event is met, the power consumption of the user equipment 20 could be reduced by performing measurements efficiently.

Figure 2:
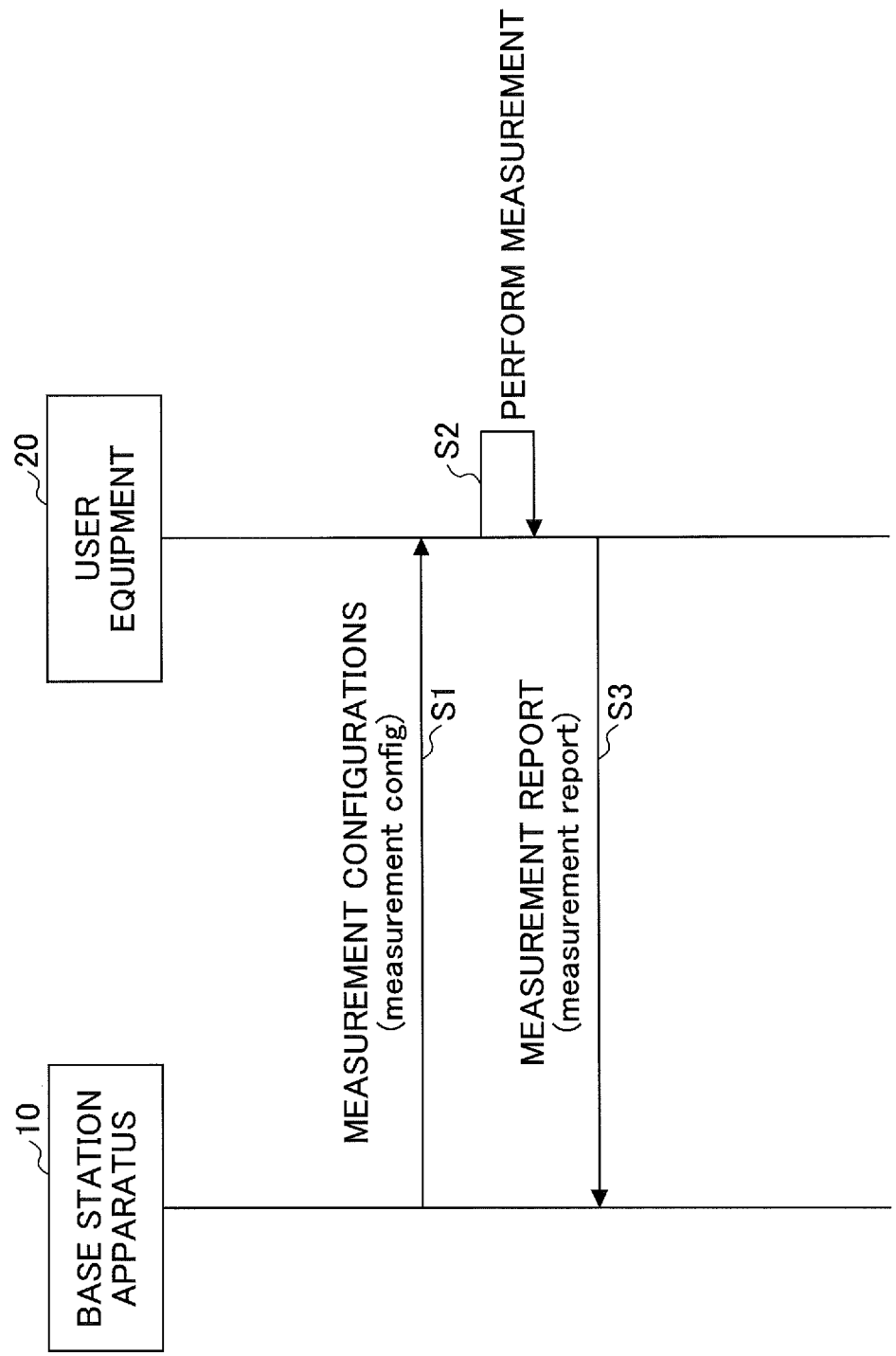
FIG. 2 is a sequential diagram for illustrating an exemplary measurement in the embodiment of the present invention.

FIG. 2 is a sequential diagram for illustrating an exemplary measurement in the embodiment of the present invention. As shown in FIG. 2, in the embodiment of the present invention, the user equipment 20 notifies the base station apparatus 10 of a measurement report.

At step S1, the base station apparatus 10 sends to the user equipment 20 information on measurement configurations. The information on measurement configurations includes an event. Next, at step S2, the user equipment 20 performs measurements based on the information on measurement configurations as received. Next, at step S3, the user equipment 20 sends a measurement report to the base station apparatus 10 when the measurement result condition set in the event is met.

Here, in the user equipment 20, it may be specified to change permissible delay time from the actual occurrence of the event to transmission of a measurement report depending upon the measurement result. Alternatively, a period with which a measurement is performed may be changed depending upon the measurement result.

Figure 3:
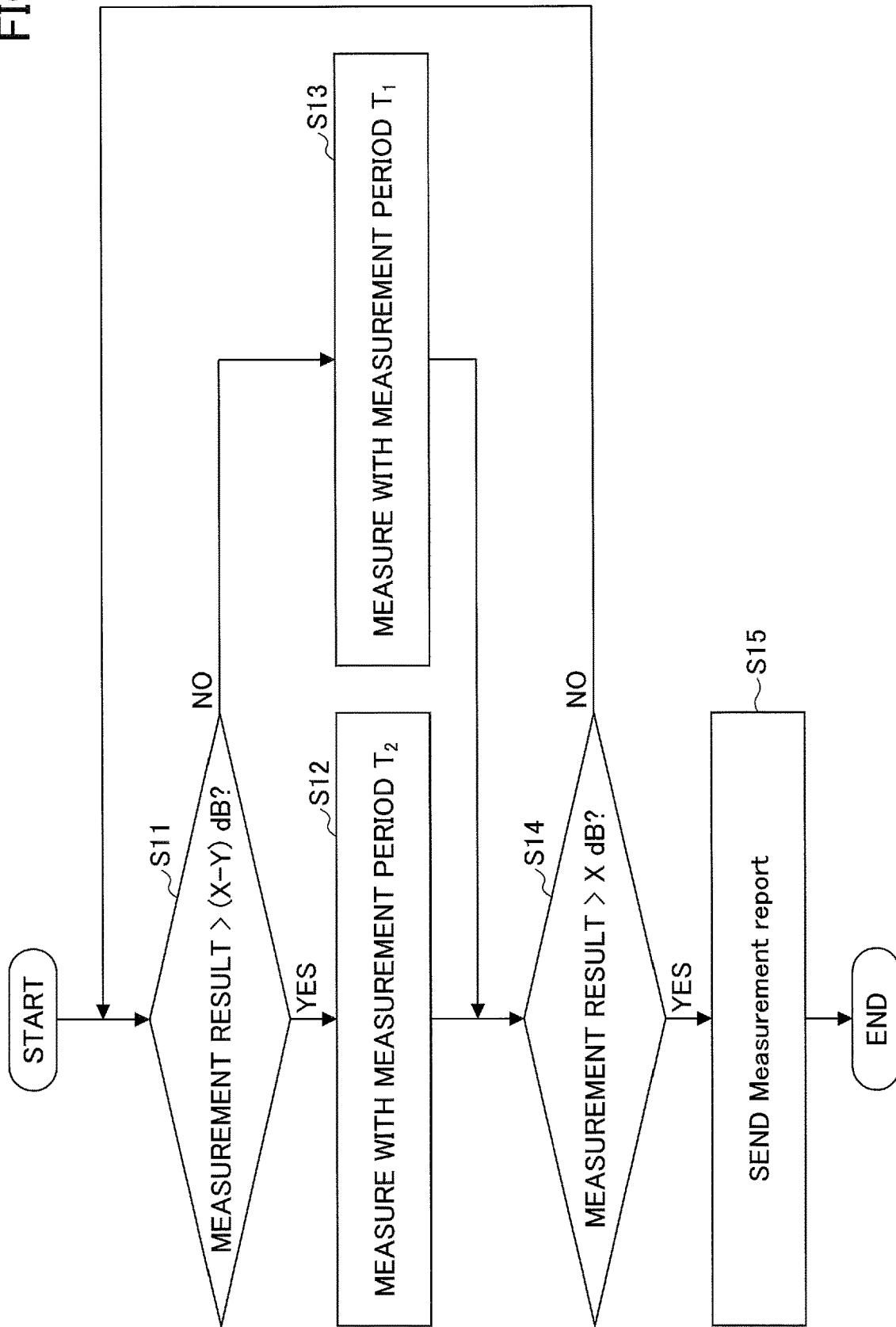
FIG. 3 is a flowchart for illustrating exemplary measurement (1) in the embodiment of the present invention.
Figure 4:
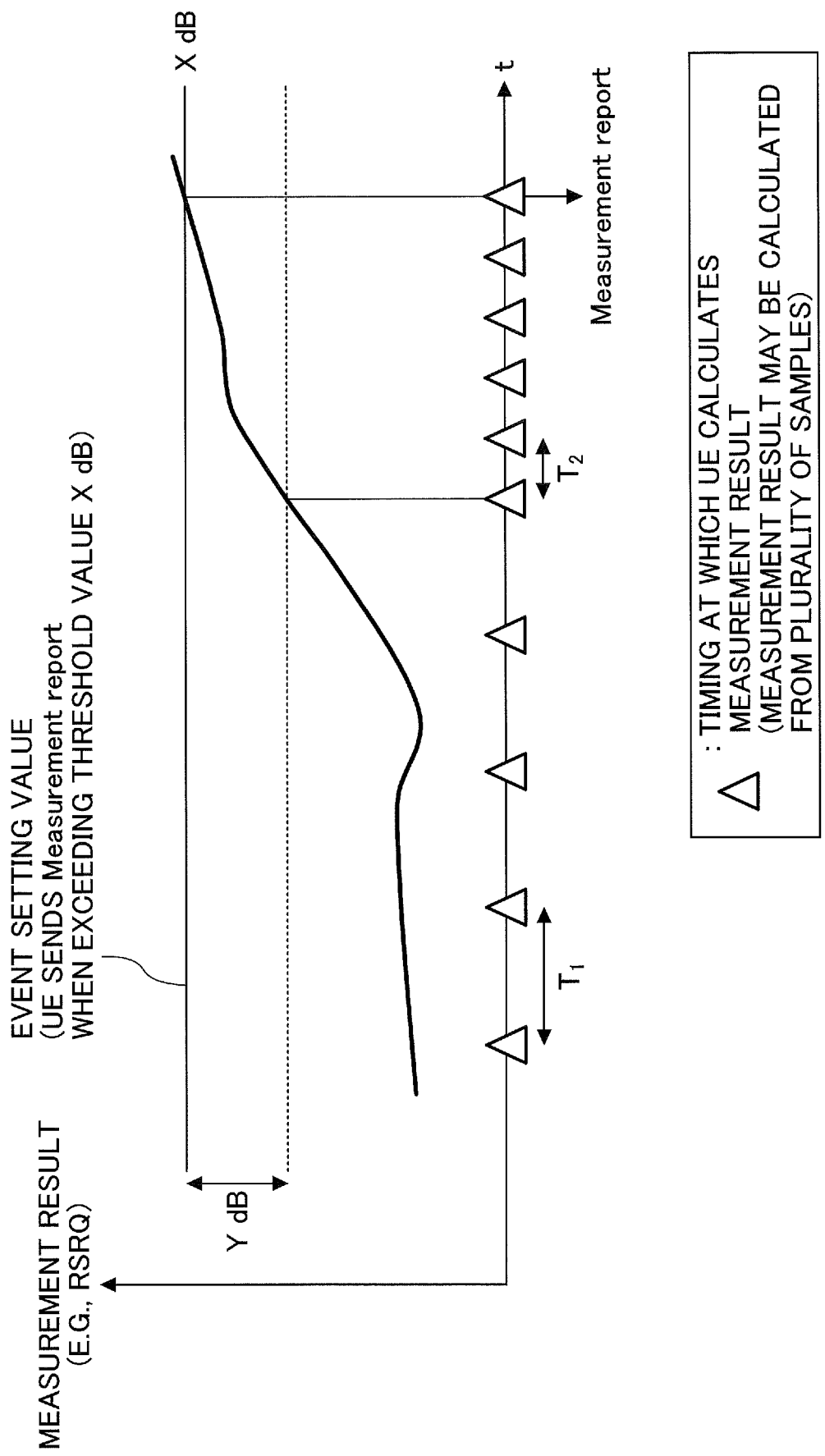
FIG. 4 is a diagram for illustrating exemplary measurement (1) in the embodiment of the present invention.

FIG. 3 is a flowchart for illustrating exemplary measurement (1) in the embodiment of the present invention. FIG. 4 is a diagram for illustrating exemplary measurement (1) in the embodiment of the present invention. Operations of the user equipment 20 at steps S2 and S3 in FIG. 2 will be described in detail with reference to FIGS. 3 and 4.

At step S11, the user equipment 20 determines whether or not the result of the measurement, such as received quality, is larger than (X−Y) dB. As shown in FIG. 4, X is a threshold value used for determining the condition set in the event. When the measurement result exceeds X dB, the user equipment 20 sends a measurement report to the base station apparatus 10. Further, Y is a relative value with respect to X used to determine switching of a measurement period $T_1$ and a measurement period $T_2$. When the measurement result is larger than (X−Y) dB (Yes at S11), the process advances to step S12, and when the measurement result is smaller than (X−Y) dB (No at S11), the process advances to step S13.

At step S12, the user equipment 20 performs a measurement with the measurement period 12 and the process advances to step S14. Conversely, at step S13, the user equipment 20 performs a measurement with the measurement period $T_1$ and the process advances to step S14. As shown in FIG. 4, the measurement period $T_1$ is longer than measurement period 12. That is, when the measurement result is less than (X−Y) dB, the user equipment 20 performs a measurement with the coarser period $T_1$, and when the measurement result exceeds (X−Y) dB, then the user equipment 20 performs a measurement with the finer period 12. It should be noted that the specifications concerning measurements may specify such that permissible delay times from the actual occurrence of events to transmission of a measurement report differ or directly specify differing measurement periods. As shown in FIG. 4, since the user equipment 20 may calculate a measurement result from a plurality of samples, the permissible delay time and the measurement period may be different from each other.

At step S14, the user equipment 20 determines whether the measurement result is larger than X dB. When the measurement result is larger than X dB (YES at S14), the process advances to step S15, and when the measurement result is smaller than X dB (No at S14), the process advances to step S11. At step 15, the user equipment 20 sends a measurement report to the base station apparatus 10.

It should be noted that determining whether to switch between the measurement period $T_1$ and the measurement period 12 may be performed based on the absolute value of the measurement result. That is, when the measurement result is larger than Z dB, a measurement may be performed with the measurement period 12, and when the measurement result is smaller than Z dB, a measurement may be performed with the measurement period $T_1$.

It should be noted that in an event where the user equipment 20 is to send a measurement report to the base station apparatus 10 when the measurement result is less than X dB, the user equipment 20 may perform a measurement with the coarser period $T_1$ when the measurement result exceeds (X+Y) dB, and the user equipment 20 may perform a measurement with the finer frequent period $T_2$ when the measurement result is less than (X+Y) dB. Further, for example, in an event where the user equipment 20 is to send a measurement result to the base station apparatus 10 when the measurement result is less than X dB, the user equipment 20 performs a measurement with the coarser period $T_1$ when the measurement result is Z dB, and the user equipment 20 perform a measurement with the finer period $T_2$ when the measurement result is less than Z dB.

For X or Y described above, a plurality of values may be specified. That is, switching of measurement periods may be performed based on values corresponding to a plurality of measurement results. For example, when the measurement result is <X−$Y_1$, the measurement period may be $T_1$, when the measurement result is >X−$Y_1$ and <X−$Y_2$, then the measurement period may be $T_2$, and when the measurement result is >X−$Y_2$, then the measurement period may be $T_3$, where $Y_1$>$Y_2$ and $T_1$>$T_2$>$T_3$.

The measurement periods or permissible delay from the actual occurrence of an event to transmission of a measurement report may be defined by time such as 10 ms or by a value according to a period of a signal to be sampled, for example, an integral multiple of a SS block period. It should be noted that the measurement result may be signal intensity such as reference signals received power (RSRP) or signal quality such as RSRQ or SINR (signal-to-Interference plus noise power ratio).

Figure 5:
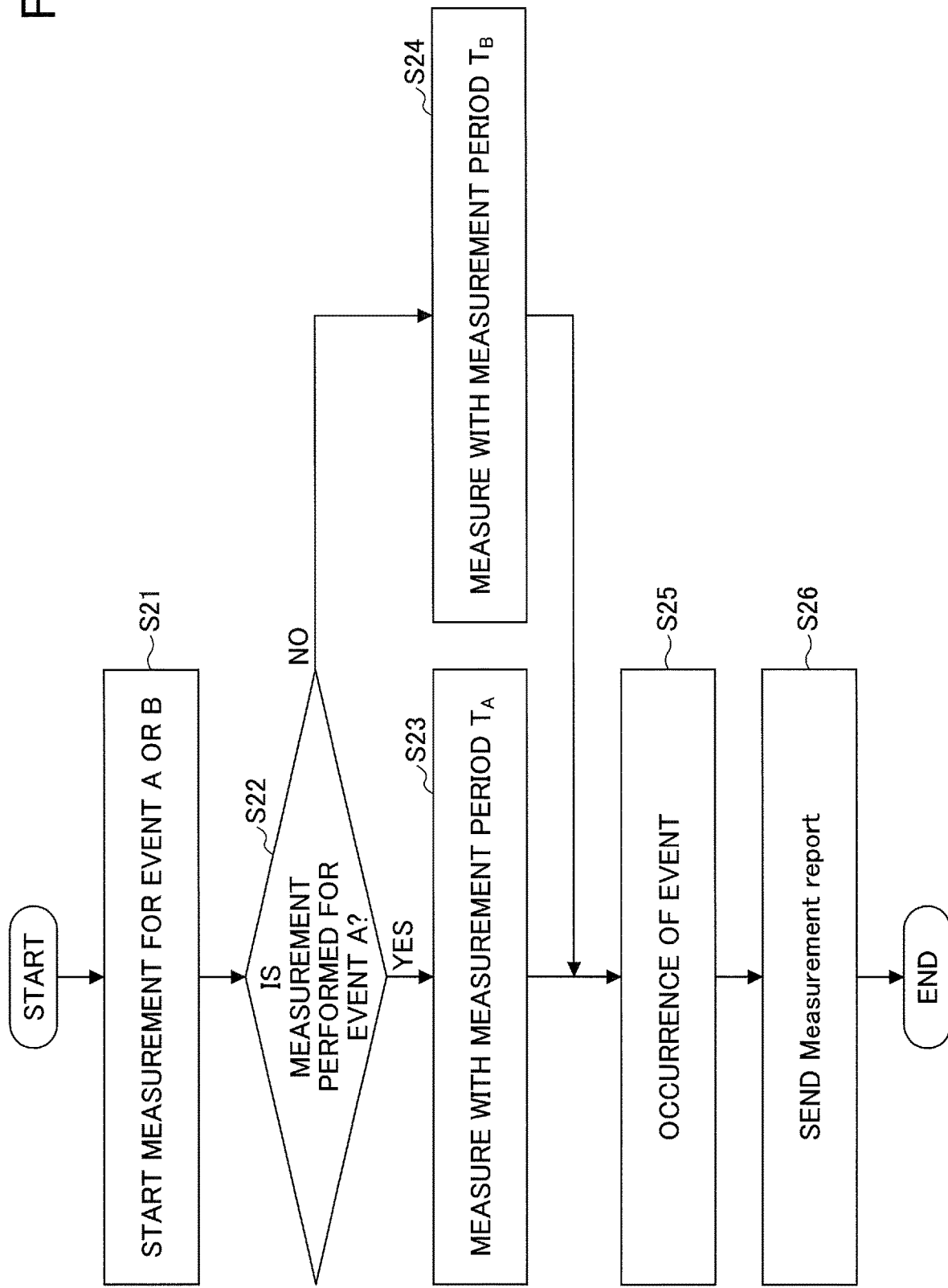
FIG. 5 is a flowchart for illustrating exemplary measurement (2) in the embodiment of the present invention.

FIG. 5 is a flowchart for illustrating exemplary measurement (2) in the embodiment of the present invention. Operations of the user equipment 20 based on events concerning measurement configurations will be described with reference to FIG. 5.

At step S21, the user equipment 20 starts a measurement for an event A or B. With regard to the measurement to be started, the event A or B is an example, and the operation may be to start a measurement for any of a larger number of events.

At step S22, the user equipment 20 determines whether or not a measurement is to be performed for the event A. When a measurement is to be performed for the event A (Yes at S22), the process advances to step S23, and when a measurement is to be performed for the event B (No at S22), the process advances to step S24.

At step S23, the user equipment 20 performs a measurement with a measurement period $T_A$ corresponding to the event A, and the process advances to step S25. Conversely, at step S24, the user equipment 20 performs a measurement with a measurement period $T_B$ corresponding to the event B, and the process advances to step S25. It should be noted that when the operation is to start a measurement for any of a larger number of events, the user equipment 20 performs a measurement with a measurement period $T_N$ corresponding to an event N for which a measurement is to be performed. When an event occurs at step S25, the user equipment 20 sends a measurement report to the base station apparatus 10 (S26).

Here, when the event A is a serving cell event, and the event B is an adjacent cell event, for example, the measurement period $T_A$ for the event A may be shorter than the measurement period $T_B$ for the event B. That is, a measurement period may be set based on the type of a cell, and a measurement is performed with a finer period for a serving cell than for an adjacent cell. Further, when the event A is an event of a band that is currently in use and the event B is an event of another band, the measurement period $T_A$ for the event A may be shorter than the measurement period $T_B$ for the event B. That is, a measurement period may be set based on the type of a band, and a measurement may be performed with a finer period for a band that is currently in use than for another band.

Further, when the event A is an event on handover and the event B is an event on a secondary cell (SCell) (e.g., SCell addition or SCell change), the measurement period $T_A$ for the event A may be shorter than the measurement period $T_B$ for the event B. That is, a measurement period may be set based on an operation with which an event is associated, and a measurement may be performed with a finer period at the time of handover than for an operation associated with a secondary cell.

As with FIG. 3, in the operations illustrated in the flowchart of FIG. 5, the measurement periods or permissible delay time from the actual occurrence of an event to transmission of a measurement may be defined by time, such as 10 ms or may be defined by a value according to a period of a signal to be sampled, such as an integral multiple of a SS block period, for example. It should be noted that a measurement result may be signal intensity such as RSRP or signal quality such as RSRQ or SINR.

It should be noted that the base station apparatus 10 may notify the user equipment 20 of any one of or a combination of the following pieces of information 1) to 3).

1) The base station apparatus 10 may notify the user equipment 20 of information on a measurement period. That is, the base station apparatus 10 may notify the user equipment 20 of a measurement period or permissible delay time from the actual occurrence of an event to transmission of a measurement report. The information on a measurement period may be defined by time such as 10 ms or may be defined by a value according to a period of a signal to be sampled, such as an integral multiple of a SS block period, for example. The measurement period information of which the user equipment 20 is notified may be used in the operation for configuring a measurement period in accordance with a measurement result as explained with reference to FIGS. 3 and 4.

2) The base station apparatus 10 may notify the user equipment 20 of information used as a condition for determining switching of measurement periods. For example, for performing an operation to switch to a coarser or to a finer granularity of a measurement period when a measurement result exceeds X dB, the base station apparatus 10 may notify the user equipment 20 of the value of X. Switching the granularity of a measurement period refers to switching of a measurement period or permissible delay time of the actual occurrence of an event to transmission of a measurement report. It should be noted that a measurement result may be signal intensity such as RSRP or signal quality such as RSRQ or SINR. Further, the base station apparatus 10 may notify the user equipment 20 of the value of Y for performing an operation to switch to a coarser or to a finer granularity of measurement period when a relative value with respect to an event exceeds a value that is lower than the event condition by Y dB. For X or Y, the base station apparatus 10 may notify the user equipment 20 of a plurality of values, and the period granularity may be switched gradually per section determined by the value of X or the value of Y. The information used as a condition for determining switching of measurement periods may be used in the operation for configuring a measurement period in accordance with a measurement result as explained with reference to FIGS. 3 and 4.

3) The base station apparatus 10 may notify the user equipment 20 of information indicating for which events measurement periods should be switched. This information may be used in the operation for configuring a measurement period according to an event as explained with reference to FIG. 5.

With regard to the value of X and the value of Y, the base station apparatus 10 may notify only of "increase" or "decrease" without directly notifying of the value of X. The user equipment 20 may be notified of a step size of "increase" or "decrease" in advance or the step size may be defined in advance, and the value of X or the value of Y may be increased by the step size when the user equipment 20 is notified of "increase" and the value of X or the value or Y may be decreased by the step size when the user equipment 20 is notified of "decrease".

The information of which the base station apparatus 10 notifies the user equipment 20 may be contained in the measurement configurations in step S1 in FIG. 2 or may be reported through radio resource control (RRC) signaling separately in advance.

It should be noted that the user equipment 20 may notify the base station apparatus 10 of user equipment (UE) capability indicating its own measurement capability or UE category indicating the type of the user equipment 20. For example, UE capability or UE category may be information indicating an amount of power consumption of the user equipment 20 per measurement period. Further, UE capability or UE category may specify performing of changing a measurement period as in the above-described example; alternatively, by the user equipment 20 notifying the base station apparatus 10 of UE capability or UE category, the user equipment 20 may notify the base station apparatus 10 of performing changing of a measurement period. Further, for example, as in the above-described example, depending on UE capability or UE category, different values may be specified for a measurement period or permissible delay time from the actual occurrence of an event to transmission of a measurement report.

By the above-described example, the user equipment 20 determines, based on a measurement result or the type of an event, a measurement period or permissible delay time from the actual occurrence of an event to transmission of a measurement report to reduce its power consumption.

That is, in a wireless communication system, the user equipment can perform a measurement effectively.

(Device Configuration)

Next, an exemplary functional configuration of the base station apparatus 10 and the user equipment 20 that perform the processes and the operations as described thus far will be described. The base station apparatus 10 and the user equipment 20 include the functions for implementing the above-described example. However, the base station apparatus 10 and the user equipment 20 each may have only a part of the functions described in the example.

<Base Station Apparatus 10>

Figure 6:
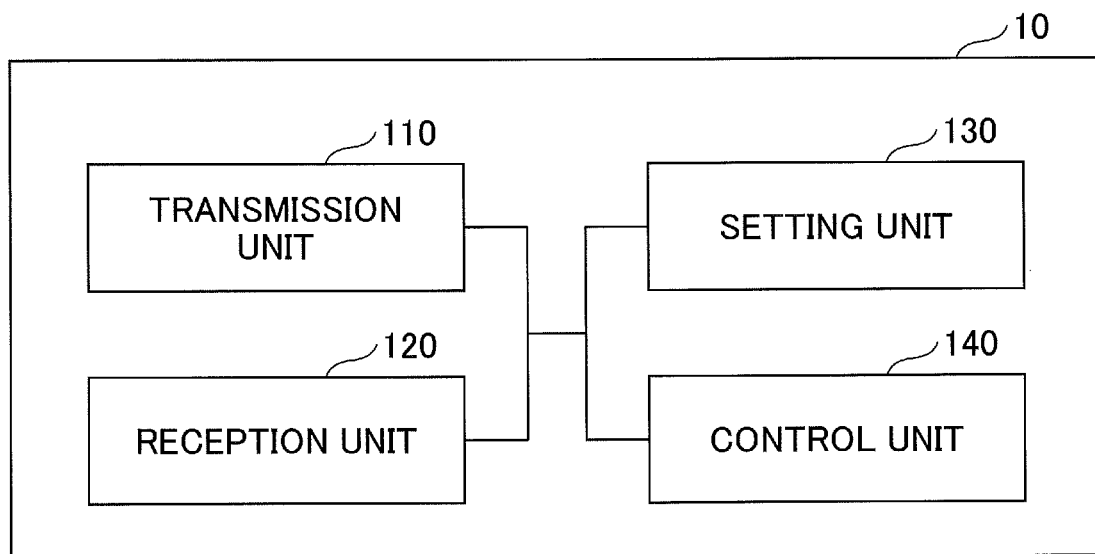
FIG. 6 is a diagram showing an exemplary functional configuration of a base station apparatus 10 in the embodiment of the present invention.

FIG. 6 is a diagram illustrating one example of a functional configuration of the base station apparatus 10. As shown in FIG. 6, the base station apparatus 10 has a transmission unit 110, a reception unit 120, a setting unit 130, and a control unit 140. It should be noted that the functional configuration shown in FIG. 6 is merely an example. Any functional division or any name may be used as long as the operations according to the embodiment of the present invention can be performed.

The transmission unit 110 includes a function of generating a signal to be sent to the user equipment 20 side and sending the signal wirelessly. The reception unit 120 includes a function of receiving a variety of signals sent from the user equipment 20 and obtaining from the received signals, for example, information on higher layers. Further, the transmission unit 110 has a function of sending NR-PSS, NR-SSS, NR-PBCH, a DL/UL control signal or the like.

The setting unit 130 stores in a memory preset setting information and various types of setting information to be sent to the user equipment 20 and reads them from the memory as needed. The contents of the setting information include, for example, information on measurements by the user equipment 20.

As described in connection with the example, the control unit 140 performs a process of generating settings of a measurement by the user equipment 20. Further, the control unit 140 performs communication control based on a measurement report obtained from the user equipment 20. A functional unit of the control unit 140 regarding signal transmission may be included in the transmission unit 110 and a functional portion of the control unit 140 regarding signal reception may be included in the reception unit 120.

<User Equipment 20>

Figure 7:
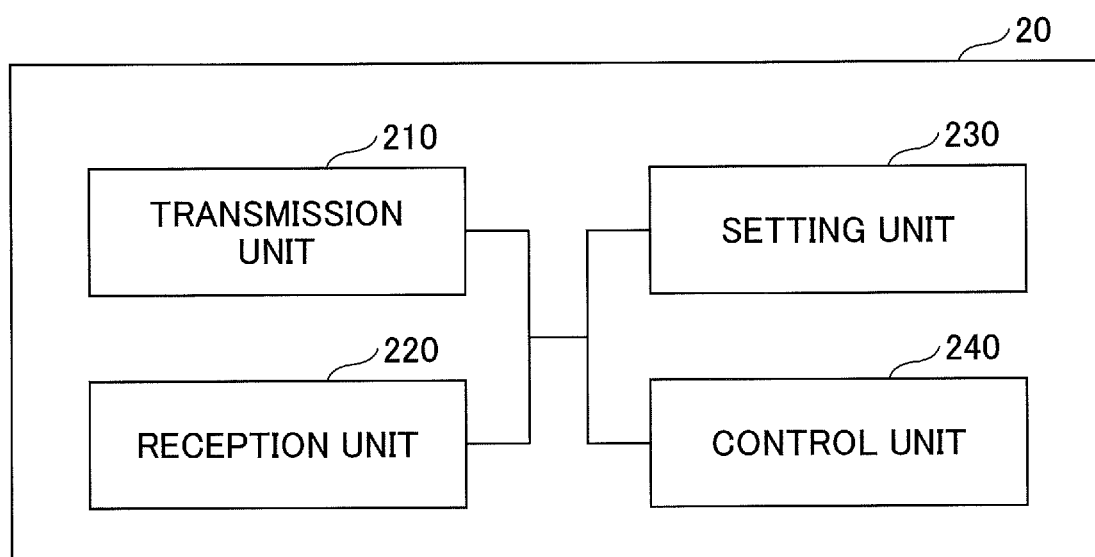
FIG. 7 is a diagram showing an exemplary functional configuration of a user equipment 20 in the embodiment of the present invention.

FIG. 7 is a diagram illustrating one example of the user equipment 20. As shown in FIG. 7, the user equipment 20 has a transmission unit 210, a reception unit 220, a setting unit 230 and a control unit 240. The functional configuration shown in FIG. 7 is merely an example. Any functional division or any name may be used as long as the operations according to the embodiment of the present invention can be performed.

The transmission unit 210 creates a transmission signal from transmission data and sends the transmission signal wirelessly. The reception unit 220 receives a variety of signals wirelessly and obtains signals of higher layers from the received physical layer signal. Further, the reception unit 220 has a function of receiving NR-PSS, NR-SSS, NR-PBCH, DL/UL/SL control signal or the like. Further, as D2D communication, the transmission unit 210 sends to other user equipment 20, a physical sidelink control channel (PSCCH), a physical sidelink shared channel (PSSCH), a physical sidelink discovery channel (PSDCH), physical sidelink broadcast channel (PSBCH), for example, and receives from another user equipment 20 PSCCH, PSSCH, PSDCH or PSBCH.

The setting unit 230 stores in a memory various types of setting information received from the base station apparatus 10 or the user equipment 20 through the reception unit 220 and reads them from the memory as needed. Further, the setting unit 230 stores preset setting information. The contents of the setting information include information on a measurement by the user equipment 20, for example.

As described in connection with the example, the control unit 240 performs a measurement based on measurement configurations obtained from the base station apparatus 10. Further, the control unit 240 reports to the base station apparatus 10 a measurement result. A functional portion of the control unit 240 regarding signal transmission may be included in the transmission unit 210 and a functional portion of the control unit 240 regarding signal reception may be included in the reception unit 220.

<Hardware Configuration>

In the functional configuration diagrams (FIGS. 6 and 7) used in the description of the above-described embodiment of the present invention, the blocks of the functional units are illustrated. These functional blocks (configuring units) are implemented by any combination of hardware and/or software. A device of implementing each functional block is not particularly limited. In other words, each functional block may be implemented by one device which is physically and/or logically combined or may be implemented by a plurality of devices, that is, two or more devices which are physically and/or logically separated and are directly and/or indirectly connected (for example, a wired and/or wireless manner).

Figure 8:
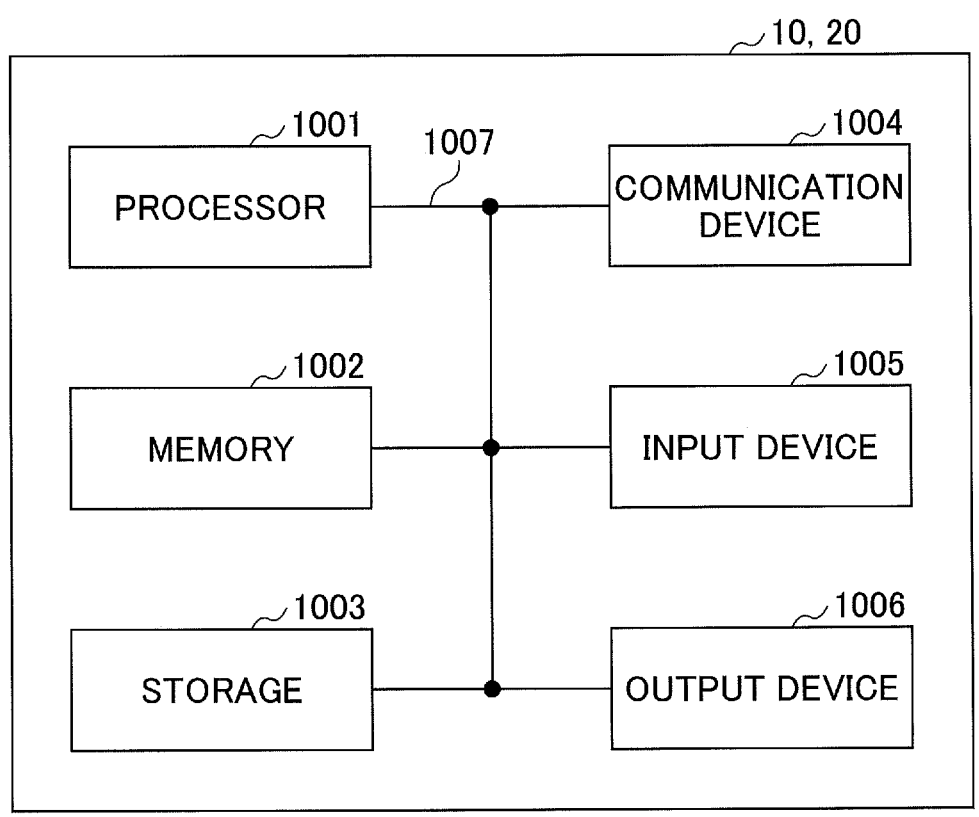
FIG. 8 is a diagram showing an exemplary hardware configuration of the base station apparatus 10 or the user equipment 20 in the embodiment of the present invention.

For example, each of the base station apparatus 10 and the user equipment 20 in one embodiment of the present invention may function as a computer that performs the process of the present invention. FIG. 8 is a diagram illustrating an example of a hardware configuration of a wireless communication equipment which is the base station apparatus 10 or the user equipment 20 according to one embodiment of the present invention. Each of the base station apparatus 10 and the user equipment 20 described above may be physically configured as a computer device that includes a processor 1001, a memory 1002, a storage 1003, a communication device 1004, an input device 1005, an output device 1006, a bus 1007, and the like.

In the following description, the term "device" can be replaced with a circuit, a device, a unit, or the like. The hardware configuration of each of the base station apparatus 10 and the user equipment 20 may be configured to include one or more devices denoted by 1001 to 1006 illustrated in the drawing or may be configured without including some devices.

Each function in each of the base station apparatus 10 and the user equipment 20 is implemented such that predetermined software (program) is read on hardware such as the processor 1001 and the memory 1002, and the processor 1001 performs an operation and controls communication by the communication device 1004 and reading and/or writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like.

Further, the processor 1001 reads a program (a program code), a software module, or data from the storage 1003 and/or the communication device 1004 out to the memory 1002, and performs various kinds of processes according to them. A program causing a computer to execute at least some of the operations described in the above embodiment is used as the program. For example, the transmission unit 110, the reception unit 120, the setting unit 130 and the control unit 140 of the base station apparatus 10 shown in FIG. 6 may be implemented by a control program which is stored in the memory 1002 and operates on the processor 1001. Further, for example, the transmission unit 210, the reception unit 220, the setting unit 230 and the control unit 240 of the user equipment 20 shown in FIG. 7 may be implemented by a control program which is stored in the memory 1002 and operates on the processor 1001. Various types of processes are described as being performed by one processor 1001 but may be performed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), etc. The memory 1002 is also referred to as a "register," a "cache," a "main memory," or the like. The memory 1002 can store programs (program codes), software modules, or the like which are executable for carrying out the signal transmission method according to an embodiment of the present embodiment.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 is also referred to as an "auxiliary storage device." The storage medium may be, for example, a database, a server, or any other appropriate medium including the memory 1002 and/or the storage 1003.

The communication device 1004 is hardware (a transmitting and receiving device) for performing communication between computers via a wired and/or wireless network and is also referred to as a "network device," a "network controller," a "network card," a "communication module," or the like. For example, the transmission unit 110 and the reception unit 120 of the base station apparatus 10 may be implemented by the communication device 1004. Further, the transmission unit 210 and the reception unit 120 of the user equipment 20 may be implemented by the communication device 1004.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrated (for example, a touch panel).

The devices, such as the processor 1001 and the memory 1002, may be connected via the bus 1007 to communicate information with each other. The bus 1007 may be configured with a single bus or may be configured with different buses between the devices.

Further, each of the base station eNB and the communication control device 200 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these hardware components.

(Summary of Embodiment)

As described above, according to the embodiment of the present invention, there is provided a user equipment, comprising: a reception unit configured to receive, from a base station apparatus, a measurement configuration including an event that sets a condition for sending a measurement report; a control unit configured to perform a measurement based on the measurement configurations; and a transmission unit configured to send to the base station apparatus, when the condition for sending a measurement report is met, a measurement report based on a result of the performed measurement, wherein the control unit determines, based on the result of the performed measurement, a period with which a measurement is performed.

As a result of the above configuration, the user equipment 20 determines, based on a measurement result, a measurement period or permissible delay time from actual occurrence of an event to transmission of a measurement report to reduce power consumption. That is, the user equipment can efficiently perform measurements in a wireless communication system.

When the result of the performed measurement is within a predetermined range close to a threshold value used to determine a condition set in the event, a period with which a measurement is performed may be made shorter than when the result of the performed measurement is out of the predetermined range. As a result of such a configuration, by shortening a measurement period based on a measurement result when a condition set by an event is likely to be met, the user equipment 20 can reduce power consumption.

When the condition set in the event is the measurement result exceeding the threshold value, the predetermined range close to the threshold value may be a range between the threshold value used to determine the condition set in the event and a value obtained by subtracting a first value from the threshold value; when the condition set in the event is the measurement result exceeding the threshold value, the predetermined range close to the threshold value may be a range between the threshold value used to determine the condition set in the event and a second value which is smaller than the threshold value; when the condition set in the event is the measurement result being less than the threshold value, the predetermined range close to the threshold value may be a range between the threshold value used to determine the condition set in the event and a value obtained by adding a third value to the threshold value; or, when the condition set in the event is the measurement result being less than the threshold value, the predetermined range close to the threshold value may be a range between the threshold value used to determine the condition set in the event and a fourth value which is larger than the threshold value. As a result of such a configuration, when the condition set by the event is likely to be met, the user equipment 20 can specify the range in detail.

A period with which a measurement is performed may be determined based on the type of the event. As a result of such a configuration, the user equipment 20 can determine a measurement period or permissible delay time from the actual occurrence of the event to transmission of a measurement report based on the type of the event to reduce power consumption.

When the type of the event is an event for a serving cell, a period with which a measurement is performed may be made shorter than when the type of the event is an event for an adjacent cell, and when the type of the event is an event for handover, a period with which a measurement is performed may be made shorter than when the type of the event is an event for a secondary cell. As a result of such a configuration, by reducing a measurement period in the case of an event with higher importance, the user equipment 20 can make a proper measurement report.

Further, according to the embodiment of the present invention, there is provided a base station apparatus, comprising: a transmission unit configured to send to a user equipment a measurement configuration including an event that sets a condition for sending a measurement report; and a reception unit configured to receive from the user equipment a measurement report based on a result of a measurement performed based on the measurement configuration, wherein the measurement configuration includes information on a measurement period or information used as a condition for determining switching of measurement periods.

As a result of the above configuration, the user equipment 20 determines, based on a measurement result, a measurement period or permissible delay time from actual occurrence of an event to transmission of a measurement report to reduce power consumption. That is, the user equipment can efficiently perform measurements in a wireless communication system.

<Supplemental Embodiments>

While embodiments of the present invention have been described above, the disclosed inventions are not limited to the embodiments, but it could be understood by those skilled in the art that various modifications, corrections, alternatives, replacements, and the like can be made thereto. While specific numerical examples have been used to facilitate understanding of the invention, the numerical values are only an example and appropriate values may be used, unless otherwise specified. The sorting of articles in the above description is not essential to the invention, but details described in two or more articles may be combined for use if necessary, or details of a certain article may be applied to details described in another article (unless incompatible). The boundaries of the functional units or the processing units in the functional block diagrams cannot be said to correspond to boundaries of physical components. The operations of two or more functional units may be performed by a single physical component or the operation of a single functional unit may be performed by two or more physical components. The order of steps of the process procedure described in the present embodiment may be interchanged unless incompatible. For the sake of simplicity of the process description, the functional block diagrams have been used to describe the base station apparatus 10 and the user equipment 20. However, such devices may be implemented by hardware, software or a combination of hardware and software. Software operated by a processor included in the base station apparatus 10 according to the embodiment of the present invention and software operated by a processor included in the user equipment 20 according to the embodiment of the present invention may each be stored in random access memory (RAM), flash memory, read only memory (ROM), EPROM, EEPROM, a register, hard disk drive (HDD), a removable disk, CD-Rom, database, server, or any other appropriate storage medium.

Notification of information is not limited to the aspects/embodiments described in this specification, but may be performed using other methods. For example, the notification of information may be performed physical layer signaling (such as downlink control information (DCI) or uplink control information (UCI)), upper layer signaling (such as radio resource control (RRC) signal, medium access control (MAC) signaling, or broadcast information (master information block (MIB) and system information block (SIB))), other signals, or combinations thereof. The RRC signaling may be referred to as an RRC message and may be, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

The processing sequences, the sequences, and the like of the embodiment/examples described above in this specification may be changed in the order as long as they are not incompatible with each other. For example, in the method described in this specification, various steps as elements are described in an exemplary order and the method is not limited to the described order.

The certain operations described in the specification as being performed by the base station apparatus 10 may be performed by a upper node in some cases. Further, the certain operations described in the specification as being performed by a base station eNB may be performed by the base station gNB. In a network formed by one or more network nodes having a base station eNB, it is clear that various operations performed for connection with a user equipment UE could be performed by a network node other than a base station eNB and/or a base station eNB (e.g., MME or S-GW may be envisioned but not limited thereto). In the above, although a case of using one network node other than a base station eNB has been described as an example, a combination of a plurality other network nodes (e.g., MME and S-GW) may be used.

The aspects described in this specification may be used alone, may be used in combination, or may be switched with implementation thereof.

The user equipment 20 may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The base station apparatus 10 may be referred to as an NodeB (NB), a base station or some other appropriate terms by those skilled in the art.

The terms "determining (determining)" and "deciding (determining)" used in this specification may include various types of operations. For example, "determining" and "deciding" may include deeming that to perform judging, calculating, computing, processing, deriving, investigating, looking up (e.g., search in a table, a database, or another data structure), or ascertaining is to perform "determining" or "deciding". Furthermore, "determining" and "deciding" may include deeming that to perform receiving (e.g., reception of information), transmitting (e.g., transmission of information), input, output, or accessing (e.g., accessing data in memory) is to perform "determining" or "deciding". Furthermore, "determining" and "deciding" may include deeming that to perform resolving, selecting, choosing, establishing, or comparing is to perform "determining" or "deciding". Namely, "determining" and "deciding" may include deeming that some operation is to perform "determining" or "deciding".

An expression "on the basis of . . . " which is used in this specification does not refer to only "on the basis of only . . . ," unless apparently described. In other words, the expression "on the basis of . . . " refers to both "on the basis of only . . . " and "on the basis of at least . . . "

So long as terms "include" and "including" and modifications thereof are used in this specification or the appended claims, the terms are intended to have a comprehensive meaning similar to a term "comprising." A term "or" which is used in this specification or the claims is intended not to mean an exclusive or.

In the entire disclosure, for example, when an article such as a, an, or the is added in translation into English, such an article refers to including the plural unless otherwise recognized from the context.

In the embodiment of the present invention, RSRP, RSRQ or SINR is one example of a measurement result.

Although the present invention is described above in detail, it is obvious to those skilled in the art that the present invention is not limited to the embodiments described in this specification. The present invention can be implemented as modifications and alterations without departing from the gist and scope of the present invention defined in claims set forth below. Accordingly, the description of this specification is intended to be exemplary and does not have any restrictive meaning to the present invention.

DESCRIPTION OF REFERENCE NUMERALS

10 Base station apparatus
110 Transmission Unit
120 Reception Unit
130 Setting Unit
140 Control Unit
20 User Equipment
210 Transmission Unit
220 Reception Unit
230 Setting Unit
240 Control Unit
1001 Processor
1002 Memory 1003 Storage
1004 Communication Device
1005 Input Device
1006 Output Device

The invention claimed is:

1. A terminal comprising:
a reception unit configured to perform measurement of a signal transmitted from a base station with a first period or a second period that is longer than the first period;
a control unit configured to
apply the first period to the measurement in a case where a value obtained by the measurement meets a condition of exceeding a value obtained by subtracting a second threshold value from a first threshold value related to switching of a measurement period, and
apply the second period to the measurement in a case where the value obtained by the measurement does not meet the condition; and
a transmission unit configured to transmit a report based on a result of the measurement to the base station.

2. A wireless communication system comprising:
a base station; and
a terminal, wherein
the terminal includes:
a first reception unit configured to perform measurement of a signal transmitted from the base station with a first period or a second period that is longer than the first period;
a control unit configured to
apply the first period to the measurement in a case where a value obtained by the measurement meets a condition of exceeding a value obtained by subtracting a second threshold value from a first threshold value related to switching of a measurement period, and
apply the second period to the measurement in a case where the value obtained by the measurement does not meet the condition; and
a first transmission unit configured to transmit a report based on a result of the measurement to the base station, and
the base station includes:
a second transmission unit configured to transmit the signal to the terminal; and
a second reception unit configured to receive the report from the terminal.

3. A communication method performed by a terminal, the method comprising:
performing measurement of a signal transmitted from a base station with a first period or a second period that is longer than the first period;
applying the first period to the measurement in a case where a value obtained by the measurement meets a condition of exceeding a value obtained by subtracting a second threshold value from a first threshold value related to switching of a measurement period;
applying the second period to the measurement in a case where the value obtained by the measurement does not meet the condition; and
transmitting a report based on a result of the measurement to the base station.

* * * * *